United States Patent [19]

Houser et al.

[11] Patent Number: 5,384,085
[45] Date of Patent: Jan. 24, 1995

[54] METHOD OF MAKING GRAPHITE COMPOSITE SHAFTS

[75] Inventors: Guy M. Houser; Robert B. Sandman, Jr., both of Spirit Lake, Iowa

[73] Assignee: Berkley, Inc., Spirit Lake, Iowa

[21] Appl. No.: 116,118

[22] Filed: Sep. 2, 1993

[51] Int. Cl.$^6$ .................... B28B 7/30; B29C 33/58
[52] U.S. Cl. .................... 264/313; 264/316; 264/320; 264/334
[58] Field of Search ............. 264/241, 313, 320, 334, 264/347, 336, 316

[56] References Cited

U.S. PATENT DOCUMENTS

| | | | |
|---|---|---|---|
| 4,158,586 | 6/1979 | Usui | 264/313 |
| 4,567,007 | 1/1986 | Harder | 264/313 |
| 4,746,386 | 5/1988 | Sato et al. | 264/313 |

OTHER PUBLICATIONS

Materials Handbook, 12th Ed. Brady et al., McGraw Hill, 1986, pp. 369–372.
Article entitled "Out of Autoclave Processing of Advanced Composites Vtilizing Silicone Elastomers", dated Apr. 18, 1991.

Primary Examiner—Christopher A. Fiorilla
Attorney, Agent, or Firm—James W. Miller

[57] ABSTRACT

An improved method of making a bent graphite shaft in which a mandrel is provided as the basic form for forming the shaft. The mandrel includes a flexible portion at the location of the desired bend in the shaft. Graphite composite material is applied to the mandrel and to the flexible portion thereof. The flexible portion is then bent into a configuration which provides the desired bend, and the flexible portion is held in this configuration while the graphite composite material is cured in situ on the mandrel to form a rigid, graphite shaft. The mandrel is then slid out of the shaft with the flexible portion of the mandrel being sufficiently flexible to allow the mandrel to pass out of the shaft without fracturing the shaft.

22 Claims, 4 Drawing Sheets

METHOD OF MAKING GRAPHITE COMPOSITE SHAFTS

TECHNICAL FIELD

This invention relates to a bent graphite shaft and to a method of making such a shaft using a graphite covered mandrel which is slid out of the shaft after the shaft is formed in situ on the mandrel. The bent graphite shafts made by the method of this invention can be used in many products, such as golf clubs, fishing rods, bicycle frame tubes, and other diverse items.

BACKGROUND OF THE INVENTION

Graphite shafts are now used in many products as substitutes for shafts made from rigid materials such as steel, wood or the like. For example, many golf clubs now have graphite shafts. Graphite shafts are favored because they are both light and strong as well as being corrosion resistant.

One method of making graphite shafts is known in which an elongated mandrel is used as a form for making the shaft. Graphite composite material is applied to the mandrel to cover the mandrel, the graphite covered mandrel is then heated to set or cure the graphite composite material to form a solid graphite shaft on the mandrel, and the mandrel is then pulled out of the shaft to release the shaft from the mandrel. This is a cost effective and widely used method of making hollow graphite shafts.

However, the above noted shaft making method has one major disadvantage. Until this invention, it could be used to make only straight graphite shafts. This was a result of having to pull the rigid mandrel out of the graphite shaft requiring that the shaft be straight to allow the rigid mandrel to pass back out of the shaft without fracturing it. In addition, unlike steel or metal shafts which once formed can thereafter be bent in a bending fixture, a straight graphite shaft cannot be bent in a subsequent bending step. This would fracture the formed and rigid graphite shaft at the bend location. Consequently, only straight graphite shafts could be produced with the known shaft making method described above.

There are many applications for which bent graphite shafts would be desirable. For example, graphite shafts used in various types of golf clubs might desirably have a bent lower end to facilitate attachment to the club head while allowing the upper end of the shaft to have the proper orientation relative to the golfer. Accordingly, there is a need in the graphite shaft industry to have an easy, cost-effective and reliable method for making bent graphite shafts.

There has been at least one previous attempt to form bent graphite shafts that was known to at least one of the Applicants. This attempt involved releasing a straight graphite shaft from the forming mandrel before the shaft is fully cured and then bending the lower end of the shaft to a desired angle. This bending step would partially fracture the partially cured lower end of the shaft. Additional graphite composite material would then be wrapped around the bent, but fractured, lower end of the shaft. The shaft would then be reheated to recure the graphite material. When finished, the graphite shaft would have a bent lower end.

However, this previous attempt at providing bent graphite shafts has numerous disadvantages. It involves various additional steps and hand labor. For example, it requires that the mandrel be removed from the partially cured shaft, that the shaft be bent and fractured, that new graphite composite material be reapplied by hand over the bent section, and that the curing process be repeated. This is a time consuming and labor intensive process, leading to an expensive shaft. In addition, given the variations in how a particular shaft might fracture when bent and in how the additional graphite composite material might be applied, there was no way to accurately repeat the bend from one shaft to the next. Accordingly, the amount of the bend could be significantly different from one shaft to the next, leading to various difficulties when using such shafts in other products, such as golf clubs.

SUMMARY OF THIS INVENTION

One aspect of this invention is to provide an improved method of making a bent graphite shaft which method is easy, relatively inexpensive, and reliable in terms of precisely placing the bend over large numbers of shafts. The improved method of this invention is a modification to the known shaft making method using a slidable mandrel.

The improved method of this invention of making a bent graphite shaft includes the steps of covering a mandrel with graphite material, of curing the graphite material in situ on the mandrel to form a rigid, graphite shaft, and of then pulling the mandrel out of one end of the shaft to release the mandrel from the shaft. The specific improvement of this invention relates to steps for forming a graphite shaft with a bend. These steps comprise providing a mandrel with a flexible portion to form that portion of the shaft having the bend, bending the flexible portion of the mandrel into a configuration for forming the bend in the shaft and holding the flexible portion of the mandrel in this configuration during the curing step, and then sliding the mandrel out of the one end of the shaft with the flexible portion of the mandrel being sufficiently flexible to straighten out when necessary to pass through the shaft.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figures 1, 3:
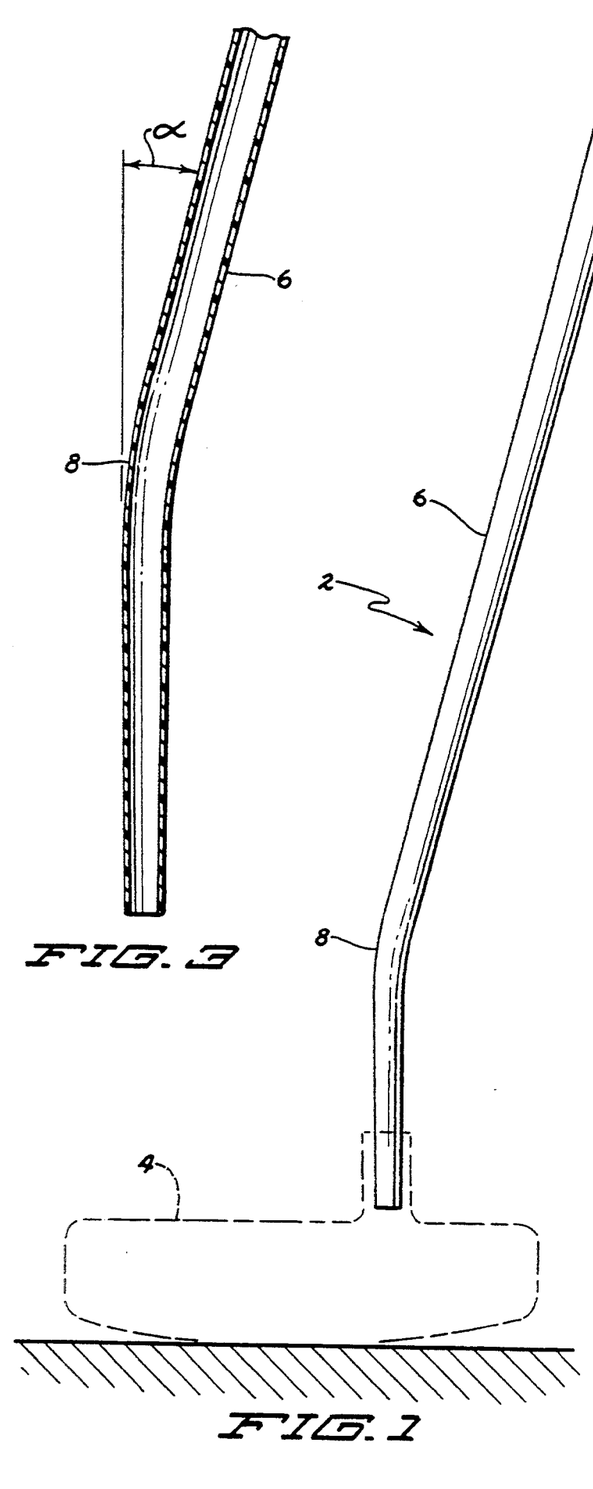
FIG. 1 is a partial side elevational view of a golf putter having a bent graphite shaft made by the method of this invention.
FIG. 3 is a partial cross-sectional view of the bent graphite shaft made by the method of this invention, taken along lines 3—3 in FIG. 2, particularly illustrating a bent lower end of the graphite shaft.

Referring first to FIG. 1, a golf putter 2 is shown having a putter head 4 attached to a generally upright shaft 6. Shaft 6 is made of graphite and is bent at its lower end where shaft 6 attaches to putter head 4. This invention relates specifically to an improved method of making bent graphite shaft 6, to bent graphite shaft 6 itself as an article of manufacture, and to any products, such as golf putter 2, which incorporate or utilize such a bent graphite shaft 6 as a portion thereof.

Figure 2:
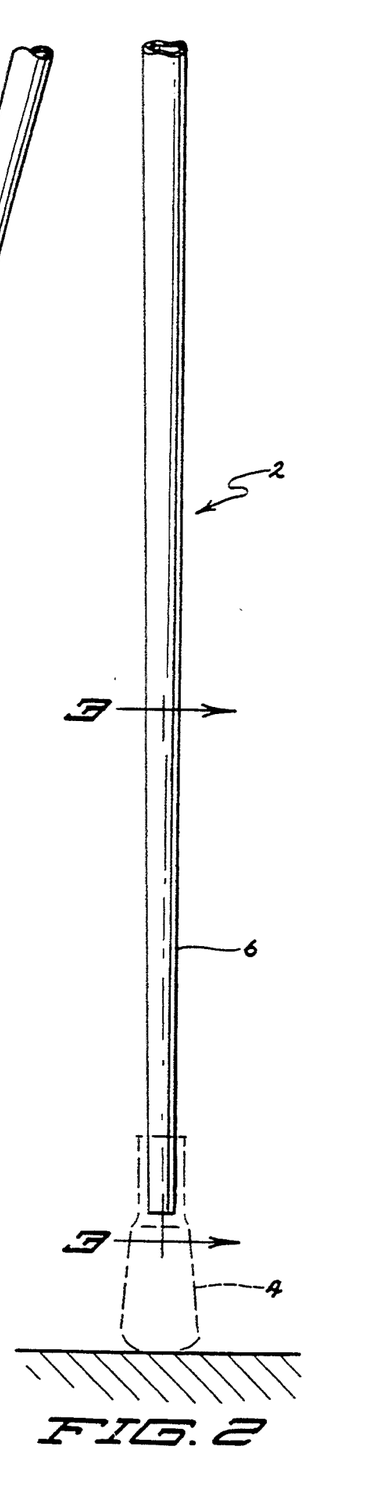
FIG. 2 is a partial end elevational view of the golf putter of FIG. 1.

While the bent graphite shaft 6 of this invention has been illustrated as part of a golf putter 2, this invention is not limited to any particular end use for graphite shaft 6. Shafts 6 made by the method of this invention may be used in a wide variety of products, not only in golf clubs, but in fishing rods, in bicycles, and indeed in any product in which a structural member desirably comprises a shaft. Accordingly, the depiction of a golf putter 2 in FIGS. 1 and 2 has been for illustrative purposes only to depict one possible end use for graphite shaft 6 of this invention.

Prior to this invention, graphite shafts were typically made as straight, linear shafts having no bends. This was a constraint imposed by the most commonly used method of making such shafts. This invention relates to an improvement to this known method of making such a shaft which allows shaft 6 to now have at least one bend therein and to the bent graphite shaft 6 formed as a result of practicing this improved shaft making method. This invention comprises the first practical method of making a bent graphite shaft.

As shown in FIG. 3, one embodiment of a graphite shaft 6 according to this invention has a single bend 8 at the lower end of shaft 6. Bend 8 thus forms a bent lower tip of shaft 6 and is oriented at an angle, denoted as α, relative to the otherwise straight portion of shaft 6.

Figure 4:
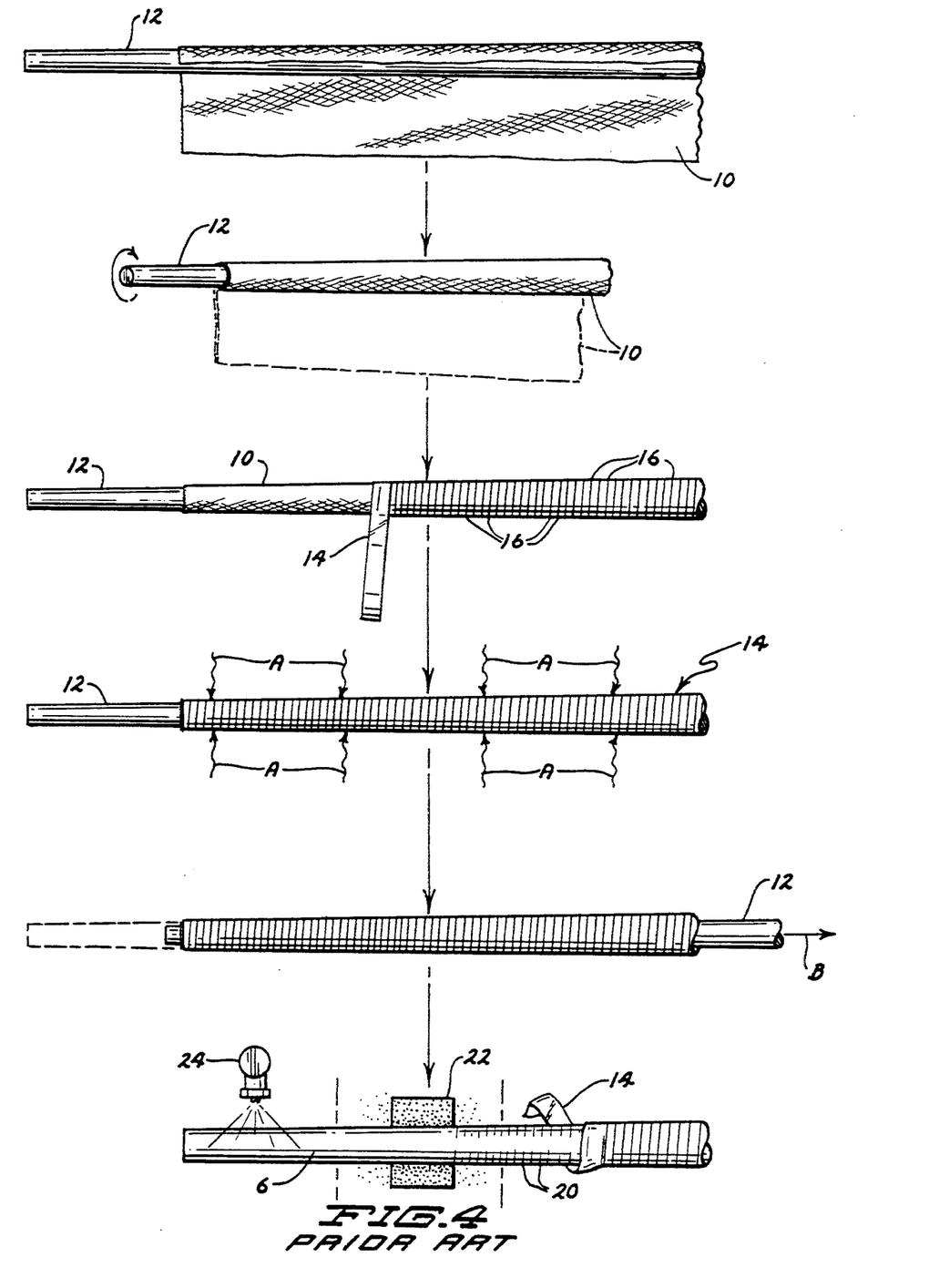
FIG. 4 is a flow chart illustration of a prior art method of making a hollow graphite shaft which sequentially shows the various steps of this prior art method.

The unique aspects of this invention can best be understood by understanding how graphite shafts have been made in the past. FIG. 4 depicts a commonly used prior art method of making straight graphite shafts. The improved method of this invention of making bent graphite shafts is a modification of this prior art method. Consequently, an understanding of the prior art method is necessary to an understanding of the improved method of this invention.

Referring to FIG. 4, the major steps of the prior art method of making a straight graphite shaft are sequentially illustrated from top to bottom in flow chart fashion. These steps may be summarized as follows:

Applying sheet(s) of graphite composite material to a straight, non-flexible mandrel;

Wrapping the graphite composite material around the mandrel;

Compressing the wrapped graphite composite material on the mandrel

Heating the mandrel with the graphite composite material thereon to set or cure the graphite composite material and thereby form a solid graphite shaft;

Pulling the mandrel out of the formed graphite shaft; and

Finishing the formed graphite shaft.

As shown in the first step at the top of page 4, graphite composite material is provided in sheets of such material, often referred to as pre-preg, that may be cut to any length or width. One such sheet is shown in FIG. 4 as 10. An elongated mandrel 12 is provided having a length at least as long, and preferably slightly longer, than shaft 6 that is to be formed. Mandrel 12 is formed of steel or some other suitably rigid, heat resistant material.

Mandrel 12 has a straight tubular or cylindrical form which is slightly tapered from one end to the other when one desires to form a tapered graphite shaft, as is true of that embodiment of graphite shaft 6 shown herein. In other words, one end of mandrel 12 has a cross-sectional area which is larger than the other end and mandrel 12 extends in a straight line between these two ends. In any event, the first step of the prior art method is to tack or overlie one or more sheets 10 of graphite composite material on mandrel 12 to apply the graphite composite material to mandrel 12.

The next step is to wrap the sheet 10 of graphite composite material around mandrel 12. This can be done in many ways, but is conventionally done simply by rolling mandrel 12 in contact with a flat surface. Typically, mandrel 12 with the tacked graphite composite sheet 10 is laid onto a planar surface, such as a table, and a rolling plate is lowered down into contact with mandrel 12. The rolling plate is then moved horizontally over the planar surface to, in effect, roll mandrel 12 to wrap sheet 10 around mandrel 12 in the manner of a window shade. This wrapping step is illustrated in the second step of FIG. 4.

After mandrel 12 has been rolled to wrap the graphite composite material around mandrel 12, a shrink wrap, plastic tape 14 is wound around the graphite covered mandrel 12 from one end to the other. This is illustrated in the third step in FIG. 4. Tape 14 is shown having successive turns 16 which are slightly offset relative to one another along the length of mandrel 12 until the entire portion of mandrel 12 covered by graphite sheet(s) 10 is also covered by tape 14. The purpose of this taping step is to apply compression to the graphite composite material, namely to force the graphite composite material into tight contact with mandrel 12.

After mandrel 12 has been taped, it is then inserted into an oven or heating device to be heated to a temperature sufficient to cause the sheets of graphite composite material to be cured or transformed into a solid graphite shaft. The temperatures required for such heating, and the time needed for the heating step, are well known to those skilled in the art. The arrows denoted as A in the fourth step of FIG. 4 are meant to illustrate the application of heat to the taped, graphite covered mandrel to set or cure the graphite composite material.

After mandrel 12 has been heated at temperatures sufficiently high for a sufficiently long period to form a solid graphite shaft 6 out of graphite sheets 10, mandrel 12 is removed from the heating device. The next step comprises removing mandrel 12 from graphite shaft 6. This is done simply by pulling mandrel 12 out of shaft 6 from the larger end thereof. This is represented by the arrow B in the fifth step of FIG. 4 which illustrates a pulling force being applied to mandrel 12 to slide mandrel 12 out of the formed graphite shaft 6.

Typically, a fixture is provided for gripping the end of mandrel 12 which sticks out of the larger end of graphite shaft 6, this fixture having means for gripping or attaching to that end of mandrel 12. The fixture can be used to completely slide mandrel 12 out of shaft 6. Alternatively, the fixture can pull mandrel 12 only a short distance out of shaft 6 to break any seal that may have been formed between mandrel 12 and shaft 6 during the curing of the graphite composite material on mandrel 6. After such a seal is broken, the operator can then slide mandrel 12 the rest of the way out of shaft 6 by hand. Regardless of the exact manner of its removal, mandrel 12 is simply slid out of shaft 6 by pulling or pushing it out from one end thereof, i.e. from the larger end when shaft 6 is tapered.

Finally, the last step of the prior art shaft making method is to finish graphite shaft 6. This involves a number of finishing substeps which are shown from right to left in the sixth step of FIG. 4. The first substep is to unwrap the shrink wrap tape 14 from graphite shaft 6, as illustrated at 18. Because small parallel ridges 20 are usually formed on shaft 6 from the overlayment of the turns 16 of tape 14, these ridges 20 are then sanded off in the next finishing substep. This sanding substep is represented by the sander 22 which may be moved along the length of graphite shaft 6 to sand off ridges 20. After tape 14 is removed and any ridges 20 or other imperfections on the surface of shaft 6 are sanded off, the last finishing substep comprises painting or coating shaft 6 as represented by the paint sprayer 24. Following these finishing substeps, namely the substeps of unwrapping tape 14, of sanding shaft 6, and of then painting the shaft, shaft 6 is then in a finished form and may be used in other products, such as golf putter 2.

The prior art graphite shaft making method just described is well known to those in the business of making graphite shafts. Various modifications to some of these steps are also well known. For example, graphite composite material can be applied to mandrel 12 by means other than applying sheets 10 of such material to mandrel 12 and then wrapping those sheets 10 around mandrel 12. Some graphite composite material is provided in fiber or filament form that can simply be wound around mandrel 12 until mandrel 12 is covered with the graphite composite material. However, the basic shaft making method shown in FIG. 4 of applying graphite material to a mandrel, of curing the graphite material on mandrel 12 to form a rigid, graphite shaft, and of then sliding mandrel 12 out of shaft 6 is the basic method to which this invention is directed. As noted above, this invention is an adaption of certain components and of certain steps used in this method to allow a bent graphite shaft to be made.

The improved method of making a bent graphite shaft according to this invention will now be described with reference to FIGS. 5–11. This method uses most of the same steps as those described in FIG. 4, and the description of these steps will not be repeated herein. Only the differences between the method of this invention and the prior art shaft making method will be described in a manner which will be sufficient to allow one to understand this invention.

Figure 5:
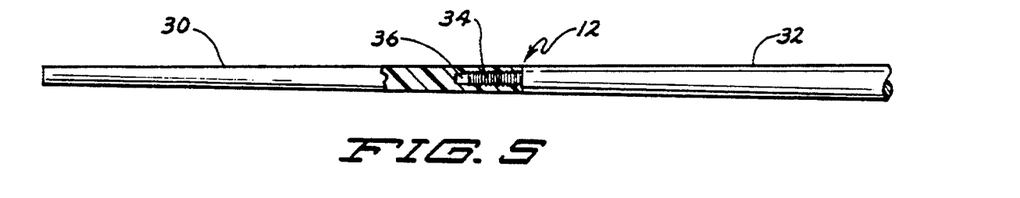
FIG. 5 is a top plan view of an improved mandrel used in the method of this invention, the improved mandrel having a flexible section as a portion thereof which is used to form the bend in the graphite shaft.
Figure 6:
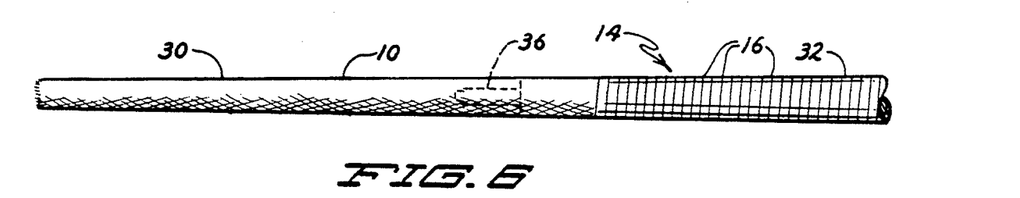
FIG. 6 is a top plan view of the improved mandrel shown in FIG. 5 with the mandrel having been covered by a graphite composite material and having had the non-flexible portion of the graphite covered mandrel wrapped with a compressive tape.

The improved method of this invention comprises the use of a mandrel 12 that is at least partially flexible. Specifically, mandrel 12 is made to be flexible over at least that portion of mandrel 12 which is used to form bend 8 in the formed graphite shaft 6. Because graphite shaft 6 as shown in FIG. 3 has bend 8 provided at its lower end, i.e. at the smaller end of shaft 6, a mandrel 12 used in the method of this invention has a flexible portion provided by a flexible tip section 30 forming that end of mandrel 12. As shown in FIG. 5, the remaining portion of mandrel 12 includes a non-flexible straight section 32 forming most of the length of mandrel 12 (straight section 32 being broken off in FIG. 5 for the purpose of clarity).

Straight section 32 is rigid and is made of any of the heat resistant materials conventionally used to form mandrel 12, such as steel. The lower end of this non-flexible, straight section 32 is provided with an elongated, threaded screw 34 which serves as means for attaching flexible tip section 30 to the non-flexible straight section 32. Flexible tip section 30 includes an internally threaded bore 36 allowing flexible tip 30 to be screwed onto screw 34 at the end of the non-flexible mandrel section 32. Other means for attaching flexible tip 30 to straight section 32 could be used. When flexible tip 30 is in place, mandrel 12 still has the same length and shape as mandrel 12 previously used, it's just that the lower end of mandrel 12 is now formed by flexible tip section 30 instead of being an integral part of the non-flexible straight section 32 of mandrel 12.

Many materials could be used to form flexible tip 30 of mandrel 12. The major requirement is that the material be sufficiently flexible so that it can bend or be disposed in various bent configurations, but can also straighten out, as will be described in more detail hereafter. The material must also be capable of withstanding the environmental conditions imposed during the step of curing graphite shaft 6. Since heat is used in this step during the particular embodiment of shaft making method shown in FIG. 4, the material forming flexible tip 30 must be able to withstand the temperatures used in this step. Teflon is one material that works well in forming flexible tip 30.

With the improved mandrel of FIG. 5 used as mandrel 12 in the previously described shaft making method, the sheets 10 of graphite composite material are still applied or tacked to mandrel 12. Mandrel 12 is then rolled to wrap mandrel 12 with the graphite composite material. Thus, the first two steps of FIG. 4 are basically the same except that the improved mandrel of FIG. 5, having flexible tip 30, is used in place of the mandrel 12 previously used.

Figure 7:
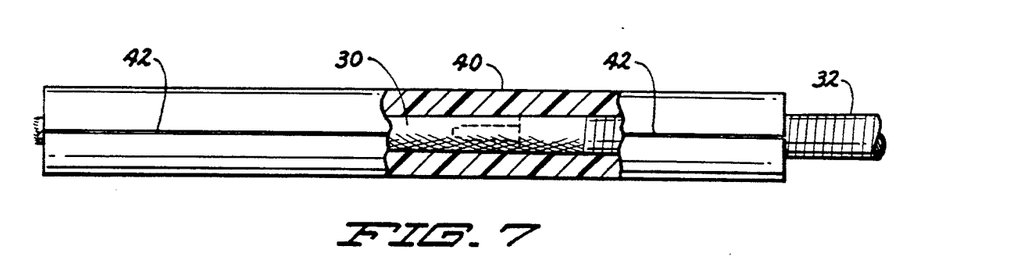
FIG. 7 is a top plan view of the mandrel shown in FIG. 6 with the flexible portion of the graphite covered mandrel having been inserted into an elastomeric sleeve.

The third step of compressing the graphite composite material against mandrel 12 is somewhat changed in the method of this invention. A shrink wrap tape 14 is still used to compress the graphite material against most of the non-flexible straight section 32 of mandrel 12. However, tape 14 terminates somewhat short of the flexible tip 30 such that tape 14 is not wound around flexible tip 30 at all. See FIG. 6 which illustrates tape 14 terminating a short distance away from flexible tip 30. Instead, as shown in FIG. 7, a smooth, rubber sleeve 40 which is slit along one side, as illustrated at 42, is placed around flexible tip 30 of mandrel 12. Since sleeve 40 is slit, sleeve 40 may be opened enough to allow it to be slipped over flexible tip 30. Sleeve 40 may be long enough to overlap a small amount over the shrink wrap tape 14. In any event, flexible tip 30 of mandrel 12 is basically covered by the smooth rubber sleeve 40, and the remaining straight section 32 of mandrel 12 is basically covered by the conventional shrink wrap tape 14.

Figure 8:
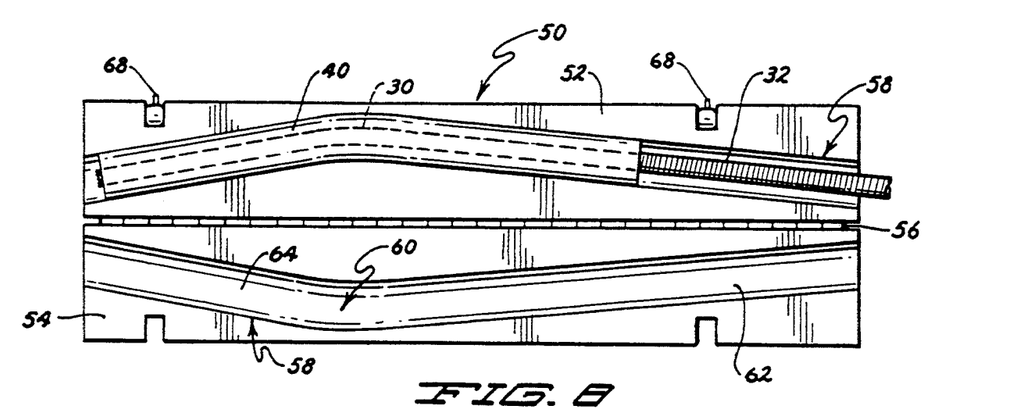
FIG. 8 is a top plan view of a mold which is used to hold the flexible portion of the mandrel shown in FIG. 7 in the desired bent orientation, the mold being shown in FIG. 8 in an open condition with the mandrel having had its flexible portion laid into a non-linear mold channel that forms the bend in the shaft.
Figure 9:
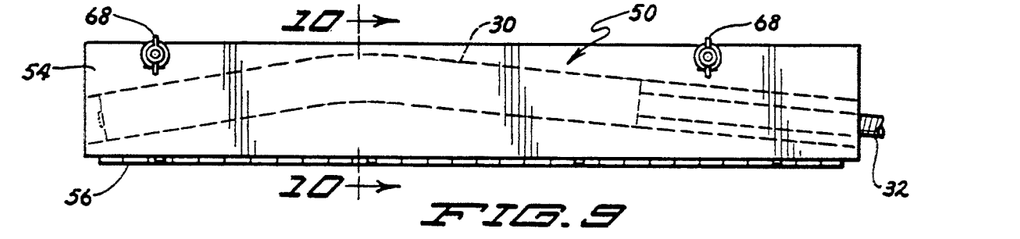
FIG. 9 is a top plan view of the mold shown in FIG. 8, illustrating the mold in a closed condition around the flexible portion of the mandrel.
Figure 10:
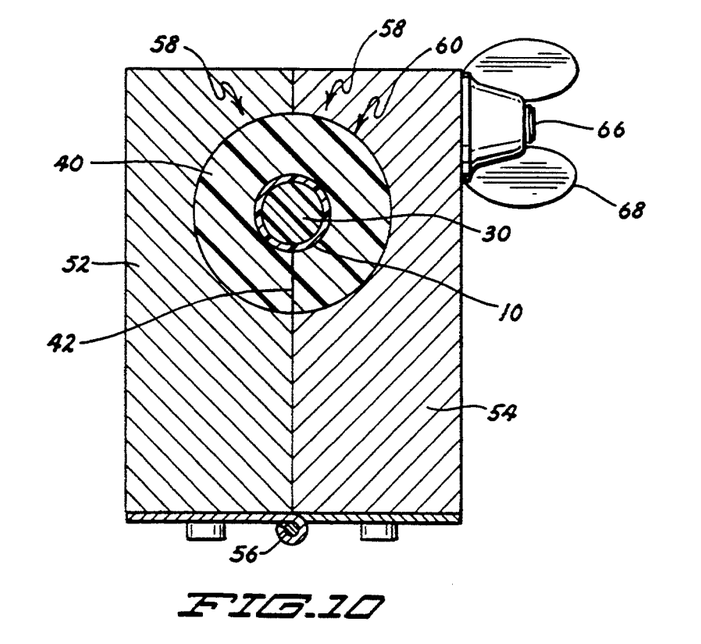
FIG. 10 is a cross-sectional view of the mold shown in FIG. 9, taken along lines 10—10 in FIG. 9.

Referring now to FIGS. 8–10, the improved shaft making method of this invention includes a mold 50 for bending flexible tip 30 of mandrel 12 into a desired bent orientation and for holding the flexible portion in that orientation. In this regard, mold 50 comprises two opposed mold halves 52 and 54 which are pivotally joined by a hinge 56. Each mold half 52, 54 includes one half 58 of a mold channel with each mold channel half 58 being generally identically shaped. Each mold channel half 58 comprises a groove 60 that is sized to receive rubber sleeve 40 therein to allow flexible tip 30 of mandrel 12 to be inserted into the mold channel. The mold channel halves 58 include the non-linear bent configuration that is desired to be formed in the end of graphite shaft 6. Namely, each mold channel half 58 includes a first straight groove section 62 corresponding to the lower section of the straight portion of shaft 6 and a second bent groove section 64 arranged at the appropriate angle α relative to the straight groove section 62.

FIG. 8 discloses mold 50 being opened with mold halves 52, 54 swung apart to allow flexible tip 30 of mandrel 12 to be inserted into one of mold channel halves 58. After this is done, as shown in FIG. 8, mold halves 52, 54 can be pivoted to a closed position in which mold channel halves 58 completely enclose flexible tip 30 and form the completed mold channel. Mold 50 includes means for holding mold halves 52, 54 in the closed position, e.g. threaded clamping bolts 66 and tightenable wingnuts 68. However, any appropriate means could be used for holding mold channel halves 52 and 54 together.

As shown in FIGS. 9 and 10, the mold channel formed by the mold channel halves 58 tightly holds flexible tip 30 in its bent orientation. In this regard, mold channel halves 58 can be tightened together sufficiently to cause a compressive force on rubber sleeve 40 to hold the graphite composite material in close contact with flexible tip 30. Or, alternatively, mold channel halves 58 could be used to loosely grip rubber sleeve 40, with sleeve 40 itself having an internal compressive force tending to compress the graphite composite material against flexible tip 30. In any event, when flexible tip 30 is received in mold 50, flexible tip 30 of mandrel 12 is held in place in the desired bent orientation, the graphite composite material is wrapped around tip 30, and the rubber sleeve/mold combination applies a compressive force to tip 30 similar to the compressive force applied to the rest of mandrel 12 by the shrink wrap tape 14.

After the flexible tip 30 is inserted into mold 50 and mold 50 is closed and tightened, mandrel 12 can then be inserted into the oven and heated in the usual manner. Mold 50 will hold flexible tip 30 of mandrel 12 in its bent orientation during the curing step until graphite shaft 6 is fully and completely formed. After graphite shaft 6 is formed, mold 50 is opened and mandrel 12 is removed from mold 50. Rubber sleeve 40 may then be removed from flexible tip 30 simply by slipping it off tip 30.

Figure 11:
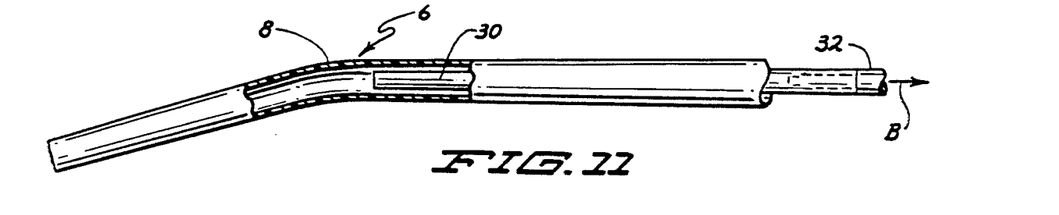
FIG. 11 is a top plan view of the step of removing the improved mandrel of FIGS. 5-10 from the bent graphite shaft which has been made by the improved method of this invention.

The importance of flexible tip 30, besides allowing a portion of shaft 12 to be formed with bend 8, can be seen in the mandrel removing step, illustrated in FIG. 11. Remember that tip 30 is flexible enough to be bent from a straight orientation and can accordingly also straighten back out when not held in the bent orientation. Thus, mandrel 12 can now be removed from shaft 6 in the conventional manner, i.e. simply by pulling mandrel 12 out of shaft 6 in the usual manner from the largest end thereof as shown by the arrow B. In this regard, referring to FIG. 11, flexible tip 30 will first pass back through the bend 8 in the now bent lower end of shaft 6. When flexible tip 30 reaches the straight section of shaft 6, it simply straightens out to pass through the straight section of shaft 6. FIG. 11 shows flexible tip 30 having passed back out of the bent lower end of graphite shaft 6 and having straightened out inside the straight section of graphite shaft 6, thus allowing mandrel 12 to pass back out through the straight portion of shaft 6.

Graphite shaft 6 may then finished in a conventional manner, i.e. by removing the shrink wrap tape 14, by sanding as necessary, and by then coating or painting shaft 6 as may be desired. Because the shrink wrap tape 14 was only applied to the straight portion of shaft 6, any ridges 20 that might need to be sanded off are contained only on the straight shaft portion. Thus, these ridges can still be sanded off using a mechanical sander of some type that can easily traverse the straight section of shaft 6.

If tape 14 had been wrapped over flexible tip 30, the ridges 20 would also have appeared on the bent lower end of shaft 6 and these would have to be sanded off by hand. However, because the compressive rubber sleeve 40 has a smooth inner surface leaving no ridges 20 on shaft 6 when it is removed, the lower end of graphite shaft 6 need not be sanded at all. This is the reason for using the rubber sleeve over the bent flexible tip 30 of mandrel 12, namely to avoid leaving any ridges 20 that would have to be sanded off by hand. However, sleeve 40 could have been replaced by shrink wrap tape 14, if one wished to bear the expense of hand sanding off any ridges 20 left on the bent lower end of shaft 6.

The improved method of this invention allows the conventional graphite shaft making method which uses an elongated mandrel 12 as the form on which the shaft 6 is made to remain in use. However, the method of this invention adapts the prior art method to allow it to integrally form one or more bends in a graphite shaft 6 at the same time that shaft 6 is made. This is a great improvement and provides a product that could not be economically provided prior to this invention. It will greatly facilitate and encourage the use of bent graphite shafts in all kinds of end use products that might require such bent shafts. The present invention allows such bent shafts to be made with highly accurate bends repeated from one shaft to the next and with little scrap or wastage.

Figure 12:
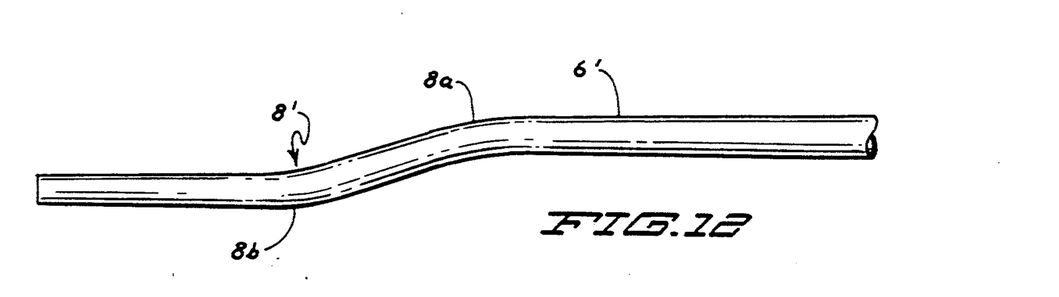
FIG. 12 is a top plan view of another bent graphite shaft made by the improved method of this invention, particularly illustrating a different bend provided therein.

This invention is not limited to forming graphite shafts with any particular bent configuration. For example, FIG. 12 shows another graphite shaft 6' which could be formed having a bent portion 8' with two different bends 8a and 8b, instead of just the single bend 8 shown in the first embodiment, thus forming a different shaped lower end for shaft 6'. The only requirement is that the mold channel in mold 50 be shaped to provide whatever bent configuration is required. As illustrated herein, this invention can be used to form a single bend 8 in shaft 6 or to form multiple bends such as the combination of two bends 8a and 8b shown in shaft 6'. When forming multiple bends, the precise number of such bends and their location along the shaft can obviously be varied. Thus, the character of the bent configuration provided in the shaft will be limited only by the needs of the designer.

Moreover, it is not necessary that bend 8 be disposed only at the end of shaft 6. It could be provided in the middle of shaft 6. In this regard, a mandrel 12 could be provided which is flexible over its entire length, but which has sufficient tensile strength (due to embedded longitudinal wires or fibers running the length of mandrel 12) to allow mandrel 12 to be pulled out of shaft 6. Mold 50 would then be lengthened so that the mold channel formed by mold channel halves 58 would run the entire length of mandrel 12 and would be used to hold the mandrel in both its bent and its straight orientations over the entire length of shaft 6. The mold channel could then have bend 8 placed anywhere along the length of mandrel 12, or have multiple bends 8 placed along the mandrel's length, with the remaining portions of the mold channel forming straight shaft sections. For example, a mold channel could be devised with straight upper and lower portions and an intermediate bent portion so that the shaft 6 ultimately formed therefrom could have a straight upper section, a bent middle section, and then a straight lower section. If mandrel 12 were flexible over its entire length, it could still be pulled out of shaft 6 with the mandrel 12 straightening out when required to pass through the straight portions of shaft 6.

Various modifications of this invention will be apparent to those skilled in the art. For example, while it is preferred that flexible tip 30 of mandrel 12 be covered by rubber sleeve 40, to avoid the necessity for hand sanding the bent portion of shaft 6, this is not strictly required for this invention. Shrink wrap tape 14, or some other means of compressing the graphite material against flexible tip 30, could be used instead. In addition, shaft 6 need not be tapered from one end to the other, but could have a uniform inner and outer diameter. In this case, mandrel 12 could be slid out of either end of shaft 6 during the mandrel removing step. Accordingly, this invention is to be limited only by the appended claims.

We claim:

1. A method of making a graphite composite shaft having a straight shaft portion and at least one bend, which comprises:
   (a) providing a mandrel with a flexible portion to form that portion of the shaft having the at least one bend;
   (b) covering at least some of the mandrel, including those sections of the flexible portion of the mandrel which are used to form the at least one bend and those portions of the mandrel used to form the straight shaft portion, with graphite composite material;
   (c) compressing the graphite composite material applied to both the flexible portion of the mandrel and to those portions of the mandrel used to form the straight shaft portion prior to curing of the graphite composite material on the mandrel, wherein the compressing step comprises compressing the graphite composite material applied to the flexible portion of the mandrel separately from the graphite composite material applied to those portions of the mandrel used to form the straight shaft portion;
   (d) bending the flexible portion of the mandrel into a bent configuration for forming the at least one bend in the shaft;
   (e) curing the graphite composite material on the mandrel to form a rigid, graphite composite shaft while holding the flexible portion of the mandrel in the bent configuration; and
   (f) sliding the mandrel out of the rigid, graphite composite shaft with the flexible portion of the mandrel being sufficiently flexible to pass out through the rigid, graphite composite shaft without fracturing the shaft.

2. The method of claim 1, wherein the curing step comprises heating the graphite composed material at a temperature sufficiently high and for a time sufficiently long to allow the graphite composite material to rigidify.

3. The method of claim 1, further including providing the flexible portion at one end of the mandrel so that the at least one bend can be formed at one end of the shaft.

4. The method of claim 1, further including:
   (a) providing a mold for holding the flexible portion of the mandrel, the mold having a mold channel therein shaped to correspond to the at least one bend;
   (b) locating the flexible portion of the mandrel in the mold channel to both bend the flexible portion into the bent configuration and to hold it in such configuration; and
   (c) leaving the flexible portion of the mandrel in the mold channel during the curing step.

5. The method of claim 1, wherein the compressing step comprises:
   (a) wrapping a tape around the graphite composite material applied to those portions of the mandrel used to form the straight shaft portion; and
   (b) applying a compressive force to the graphite composite material applied to the flexible portion of the mandrel using a compression member having a smooth inner surface.

6. The method of claim 5, wherein the compression member comprises an elastomeric sleeve.

7. The method of claim 6, further including:
   (a) providing a mold for holding the flexible portion of the mandrel, the mold having a mold channel therein shaped to correspond to the at least one bend;
   (b) with the sleeve in place and surrounding the flexible portion of the mandrel, thereafter locating the flexible portion of the mandrel in the mold channel to both bend the flexible portion into the bent configuration and to hold it in such configuration such that the sleeve is interposed between the flexible portion of the mandrel and the mold channel; and
   (c) leaving the flexible portion of the mandrel and the sleeve in the mold channel during the curing step.

8. The method of claim 7, wherein the curing step comprises heating the graphite composite material at a temperature sufficiently high and for a time sufficiently long to allow the graphite composite material to rigidify.

9. The method of claim 8, wherein the heating step comprises placing the mandrel covered with the graphite composite material, including the mold and sleeve surrounding the flexible portion of the mandrel, in an oven and thereafter heating said graphite composite material.

10. The method of claim 1, further including providing the mandrel with a relatively rigid, straight section adjacent the flexible portion thereof to form a straight shaft portion adjacent the at least one bend in the shaft.

11. The method of claim 10, further including providing the flexible portion at one end of the mandrel so that the at least one bend can be formed at one end of the shaft.

12. The method of claim 1, wherein the bending step comprises bending the flexible portion of the mandrel to provide a single bend in the shaft.

13. The method of claim 1, wherein the bending step comprises bending the flexible portion of the mandrel to provide multiple bends in the shaft.

14. The method of claim 1, wherein the flexible portion of the mandrel comprises only a portion of the mandrel's overall length.

15. The method of claim 12, wherein the mandrel includes a relatively rigid, non-flexible straight section to which the flexible portion of the mandrel is joined.

16. A method of making a graphite composite shaft having a straight portion and a bent tip portion at one end of the straight portion, which comprises:
(a) providing a mandrel with a relatively rigid, non-flexible straight section used to form the straight portion of the shaft and a disparate flexible portion at one end of the straight section to form the bent tip portion of the shaft;
(b) covering both the straight mandrel section and the flexible portion of the mandrel with graphite composite material;
(c) bending only the flexible portion of the mandrel into a bent configuration for forming at least one bend in the shaft;
(d) curing the graphite composite material on the mandrel to form a rigid, graphite composite shaft while holding the flexible portion of the mandrel in the bent configuration; and
(e) sliding the mandrel out of the rigid, graphite composite shaft with the flexible portion of the mandrel being sufficiently flexible to straighten out when passing through the straight portion of the shaft.

17. The method of claim 16, wherein the bending step comprises bending the flexible portion of the mandrel to provide a single bend in the shaft.

18. The method of claim 16, wherein the bending step comprises bending the flexible portion of the mandrel to provide multiple bends in the shaft.

19. A method of making a graphite composite shaft having a straight shaft portion and at least one bend, which comprises:
(a) providing a mandrel with a flexible portion to form that portion of the shaft having the at least one bend;
(b) covering at least some of the mandrel, including those sections of the flexible portion of the mandrel which are used to form the at least one bend and those portions of the mandrel used to form the straight shaft portion, with graphite composite material;
(c) compressing the graphite composite material applied to both the flexible portion of the mandrel and to those portions of the mandrel used to form the straight shaft portion prior to curing of the graphite composite material on the mandrel, wherein the compressing step includes compressing the graphite composite material applied to the flexible portion of the mandrel by inserting the flexible portion of the mandrel into an elastomeric sleeve having a smooth inner surface;
(d) bending the flexible portion of the mandrel into a bent configuration for forming the at least one bend in the shaft, wherein the bending step comprises:
  (i) providing a mold for holding the flexible portion of the mandrel, the mold having a mold channel therein shaped to correspond to the at least one bend;
  (ii) with the sleeve in place and surrounding the flexible portion of the mandrel, thereafter locating the flexible portion of the mandrel in the mold channel to both bend the flexible portion into the bent configuration and to hold it in such configuration such that the sleeve is interposed between the flexible portion of the mandrel and the mold channel;
(e) heating the sleeve, the mold and the graphite composite material at a temperature sufficiently high and for a time sufficiently long while holding the flexible portion of the mandrel in the bent configuration to allow the graphite composite material to rigidify on the mandrel to form a rigid, graphite composite shaft;
(f) removing the mold and the sleeve from the flexible portion of the mandrel; and
(g) sliding the mandrel out of the rigid, graphite composite shaft with the flexible portion of the mandrel being sufficiently flexible to pass out through the rigid, graphite composite shaft without fracturing the shaft.

20. The method of claim 19, wherein the heating step comprises placing the mandrel covered with the graphite composite material, including the mold and sleeve surrounding the flexible portion of the mandrel, in an oven and thereafter heating said graphite composite material.

21. The method of claim 19, wherein the compressing step further includes compressing the graphite composite material on those portions of the mandrel used to form the straight shaft portion by wrapping a tape therearound.

22. A method of making a graphite composite shaft, which comprises:
(a) providing a mandrel;
(b) covering at least some of the mandrel with graphite composite material;
(c) compressing the graphite composite material applied to at least one portion of the mandrel by inserting the at least one portion of the mandrel into an elastomeric sleeve having a smooth inner surface;
(d) providing a mold for holding the at least one portion of the mandrel, the mold having a mold channel therein shaped to receive the at least one portion of the mandrel and the sleeve;
(e) with the sleeve in place and surrounding the at least one portion of the mandrel, thereafter locating the at least one portion of the mandrel in the mold channel such that the sleeve thereon is interposed between the at least one portion of the mandrel and the mold channel;
(f) heating the sleeve, the mold and the graphite composite material at a temperature sufficiently high and for a time sufficiently long to allow the graphite composite material to rigidify on the mandrel to form a rigid, graphite composite shaft;
(g) removing the mold and the sleeve from the at least one portion of the mandrel; and
(h) sliding the mandrel out of the rigid, graphite composite shaft.

* * * * *